(12) United States Patent

Rodriguez et al.

(10) Patent No.: US 12,558,966 B2

(45) Date of Patent: Feb. 24, 2026

(54) SYSTEM AND METHOD FOR PROVIDING DONUT MODE ON BATTERY ELECTRIC VEHICLE

(71) Applicant: FCA US LLC, Auburn Hills, MI (US)

(72) Inventors: Paul E. Rodriguez, White Lake, MI (US); Jeremy J. Anker, Lake Orion, MI (US); Sean King, Macomb Township, MI (US); Dean Baker, Rochester Hills, MI (US); Jon Strunk, Rochester Hills, MI (US); Allison Singer, Oxford, MI (US); Jason Trombley, Imlay City, MI (US); David Carr, Brighton, MI (US); Haley Lee, Rochester Hills, MI (US); Kanishk Bakshi, Farmington Hills, MI (US); Mark Platt, Van Buren Township, MI (US); Brian Driscoll, New Hudson, MI (US); Joe Nissen, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 152 days.

(21) Appl. No.: 18/499,337

(22) Filed: Nov. 1, 2023

(65) Prior Publication Data

US 2025/0135902 A1      May 1, 2025

(51) Int. Cl.
*B60L 15/20*        (2006.01)
*B60L 58/12*        (2019.01)

(52) U.S. Cl.
CPC .............. *B60L 15/20* (2013.01); *B60L 58/12* (2019.02); *B60L 2240/461* (2013.01); *B60L 2240/463* (2013.01); *B60L 2240/465*
(2013.01); *B60L 2240/642* (2013.01); *B60L 2250/16* (2013.01); *B60L 2260/20* (2013.01)

(58) Field of Classification Search
USPC .......................................................... 701/22
See application file for complete search history.

(56) References Cited

U.S. PATENT DOCUMENTS

| | | | |
|---|---|---|---|
| 10,596,902 B2 * | 3/2020 | Lim ................... | B60K 23/0808 |
| 10,773,708 B2 * | 9/2020 | Ruybal ................... | B60K 6/52 |
| 2013/0073166 A1 * | 3/2013 | Sollart ................ | B60W 30/184 |
| | | | 701/99 |
| 2013/0190954 A1 * | 7/2013 | Abihana ............... | B60W 10/06 |
| | | | 180/65.265 |
| 2022/0024306 A1 * | 1/2022 | O'Rourke ............ | B60K 17/354 |

(Continued)

*Primary Examiner* — Adam D Tissot

(74) *Attorney, Agent, or Firm* — Jeremy J. Klobucar

(57)        ABSTRACT

A vehicle system and method for a vehicle implements a donut mode to vehicle wheels for creating a donut. A motor provides drive torque to at least one wheel of the vehicle wheels for propelling the vehicle. A steering wheel communicates a steering wheel signal indicative of a direction intended for the vehicle to travel. An instrument panel cluster displays a user interface menu that includes a user selectable donut mode. The controller initiates a donut mode based on user selection of the donut mode. The controller determines whether vehicle conditions are satisfied and enables torque to be delivered from the motor to the left and right rear wheels. Speed differential is enabled between the left and right rear wheels and the left and right front wheels. Based on a direction of the steering wheel, a desired torque input is determined to one of the left and right rear wheels.

14 Claims, 4 Drawing Sheets

(56)                    References Cited

U.S. PATENT DOCUMENTS

| | | | |
|---|---|---|---|
| 2022/0080837 A1* | 3/2022 | Pettersson | B60T 8/17551 |
| 2023/0022906 A1* | 1/2023 | Balachandran | B60W 10/20 |
| 2023/0063054 A1* | 3/2023 | Maddi Reddy | B60W 50/14 |
| 2025/0091581 A1* | 3/2025 | Yoon | B60W 30/02 |
| 2025/0145019 A1* | 5/2025 | Farahmand | B60W 50/082 |
| 2025/0145148 A1* | 5/2025 | Lian | B60K 23/0808 |

* cited by examiner

140

150

SYSTEM AND METHOD FOR PROVIDING DONUT MODE ON BATTERY ELECTRIC VEHICLE

FIELD

The present disclosure relates generally to a system and method for providing a donut mode on a battery electric vehicle.

BACKGROUND

A donut is a vehicle maneuver where the rear wheels rotate around the front wheels in a continuous motion creating a circular skid mark pattern of rubber on a road surface (e.g., pavement) typically accompanied with smoke emanating from the tires. While less popular, a donut can also be created by rotating the front wheels around the rear wheels in a similar manner. Ideally a donut is performed in a closed environment. It can be difficult to perform a donut on an all-wheel drive vehicle as traction limits must be exceeded with elevated differentials experienced on the front and rear axles. In this regard, while a donut can be accomplished when purposefully intended by an experienced driver, there remains a need for improvement in the relevant art.

SUMMARY

In one example aspect of the invention, a vehicle system for a vehicle that implements a donut mode to vehicle wheels for creating a donut includes a motor, a steering wheel, an instrument panel and a controller. The motor provides drive torque to at least one wheel of the vehicle wheels for propelling the vehicle. The vehicle wheels include a left and right rear wheels and left and right front wheels. The steering wheel communicates a steering wheel signal indicative of a direction intended for the vehicle to travel. The instrument panel cluster is configured to display a user interface menu that includes a user selectable donut mode. The controller initiates a donut mode based on user selection of the donut mode. The controller determines whether vehicle conditions are satisfied and enables torque to be delivered from the motor to the left and right rear wheels. Speed differential is enabled between the left and right rear wheels and the left and right front wheels. A direction of the steering wheel is determined based on the steering wheel signal and, based on the direction, a desired torque input is determined to one of the left and right rear wheels. The motor is instructed to deliver the desired torque.

In another aspect, the vehicle conditions include a battery system that powers the motor having a charge above a charge threshold. In examples, the charge threshold is 20%.

In some implementations, the vehicle conditions include a steering wheel input indicative of a straight direction.

In some configurations, the vehicle system further comprises a grade sensor that communicates a grade signal to the controller indicative of a grade the vehicle occupies. The vehicle conditions include a grade of zero.

According to additional examples, the vehicle system further comprises wheel speed sensors at each of the vehicle wheels that communicate wheel speed signals to the controller. The vehicle conditions include wheels speeds from the respective wheel speed sensors of zero.

In additional implementations, the vehicle system further comprises a park brake that communicates a park brake signal to the controller. The vehicle conditions include a park brake signal indicative of the park brake being not engaged.

In examples, the user interface menu includes a wheel slip meter that displays a wheel slip of the left rear wheel and the right rear wheel A method for implementing a donut mode to vehicle wheels for creating a donut on an electrified vehicle having an electric motor is provided. In one example implementation, a determination is made whether the donut mode has been activated. A determination is made whether vehicle conditions are satisfied. Based on the vehicle conditions being satisfied, torque is enabled to be delivered from the electric motor to left and right rear wheels of the vehicle wheels. Speed differentiation is enabled between the left and right rear wheels and left and right front wheels of the vehicle wheels. A direction of a steering wheel input is determined. Based on the direction of the steering wheel input a desired torque input to the left and right rear wheels is determined. The motor is instructed to deliver the desired torque based on the determined desired torque input.

In examples, determining whether the donut mode has been activated comprises displaying, at an instrument panel cluster, a user interface menu that includes a user selectable donut mode; and receiving a signal indicative of a user selecting the user selectable donut mode.

In examples, determining whether vehicle conditions are satisfied comprises determining whether a battery system that powers the motor has a charge above a charge threshold. In some examples, the charge threshold is 20%.

In other examples, determining whether vehicle conditions are satisfied comprises receiving a steering wheel signal from the steering wheels; and determining that the steering wheel signal is indicative of a straight direction.

In other examples, determining whether vehicle conditions are satisfied comprises receiving a grade signal from a grade sensor; and determining that the grade sensor signal is indicative of a level ground.

In other examples, determining whether vehicle conditions are satisfied comprises receiving speed signals from wheel speed sensors at the left and right front wheels and the left and right rear wheels; and determining that the speed signals are indicative of zero speed.

In other examples, determining whether vehicle conditions are satisfied comprise receiving a park brake signal from a park brake; and determining that the park brake signal is indicative of the park brake not being engaged.

In additional examples, the method includes displaying at a user interface menu a wheel slip meter that displays a wheel's slip graphic for the left rear wheel and the right rear wheel.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
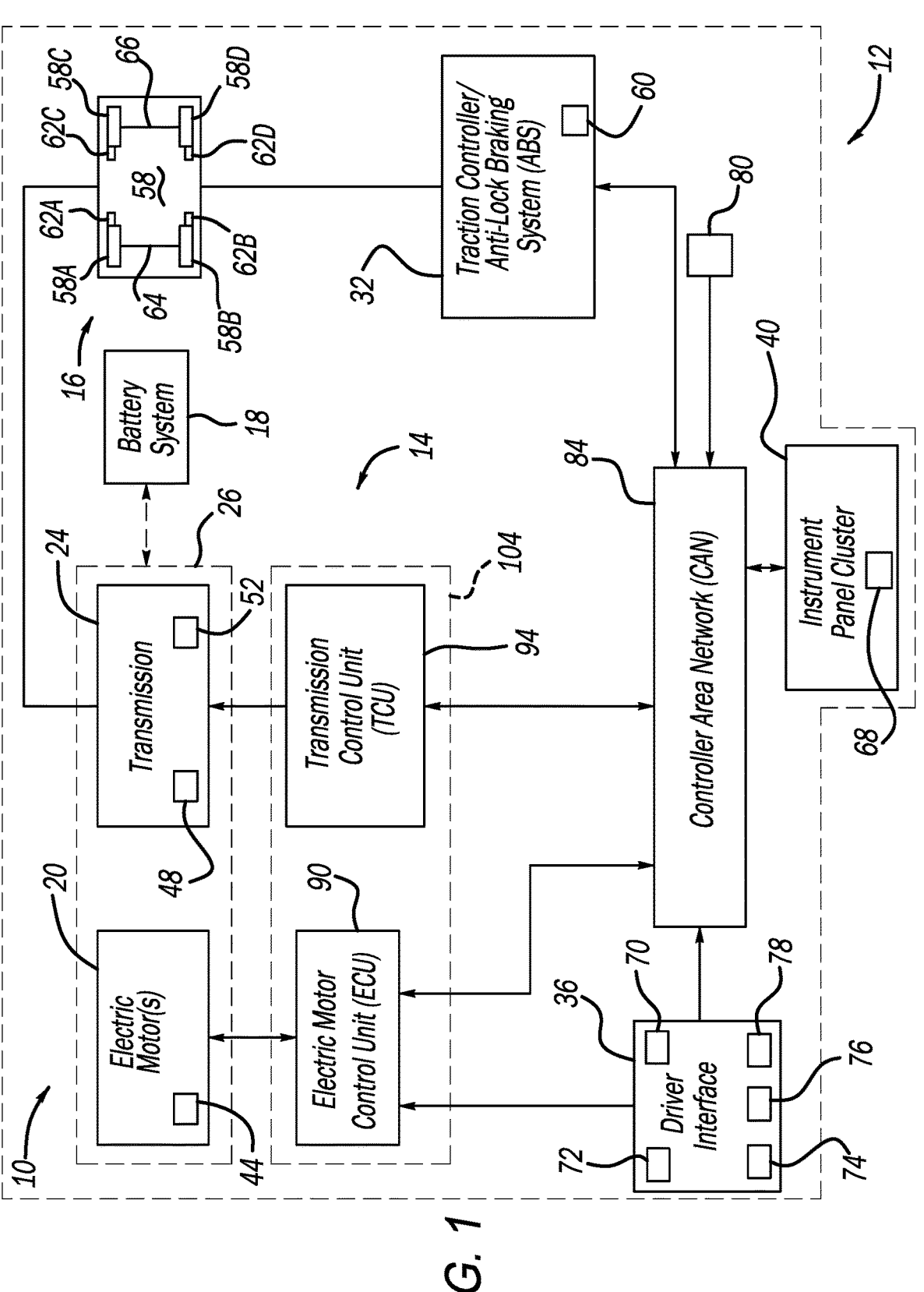
FIG. 1 is a schematic block diagram of an exemplary vehicle system according to the principles of the present disclosure.
Figure 2A:
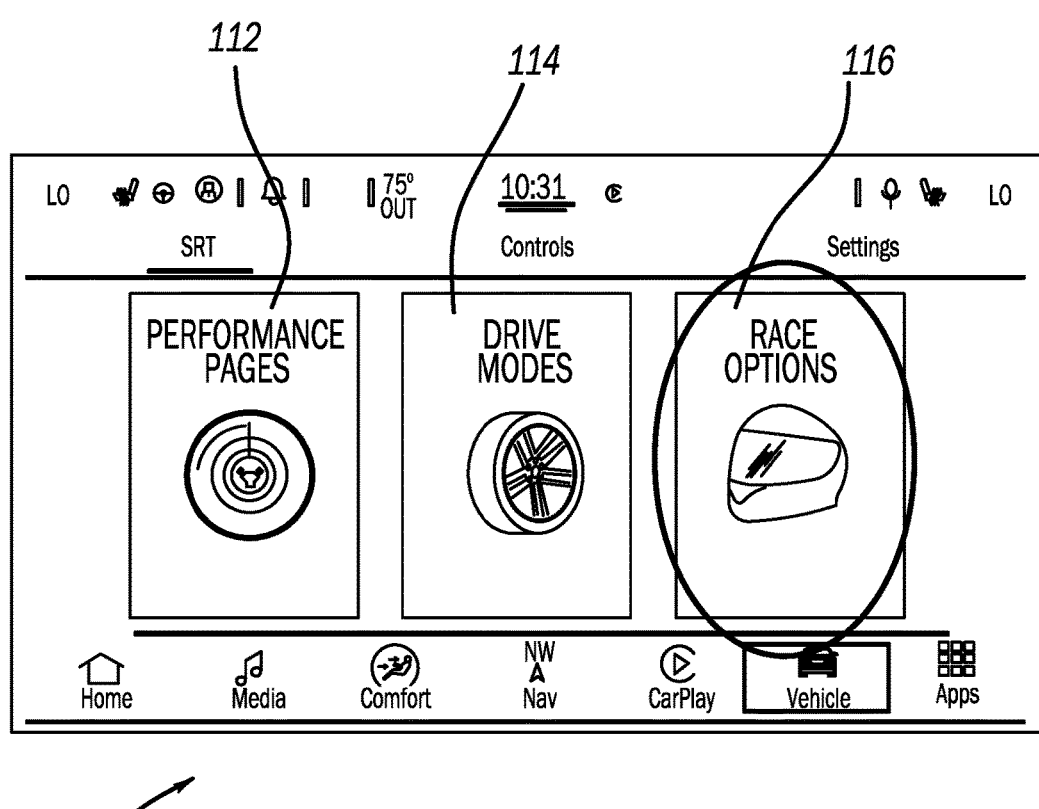
FIGS. 2A-2D are exemplary menu interfaces provided on the instrument panel cluster of the vehicle system of FIG. 1 for entering donut mode according to the principles of the present disclosure.
Figure 2B:
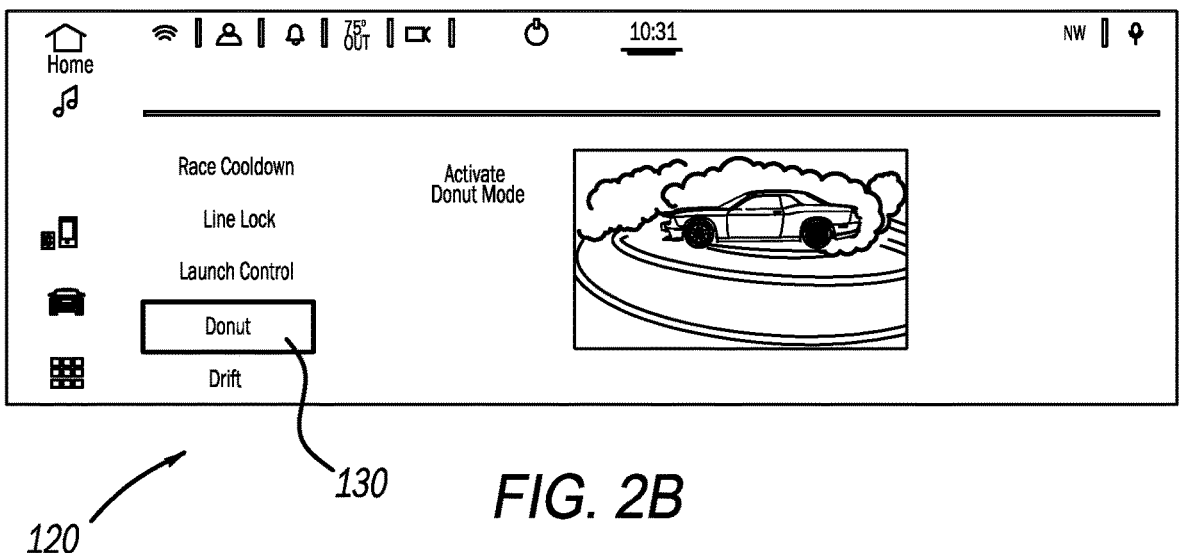
Figure 2C:
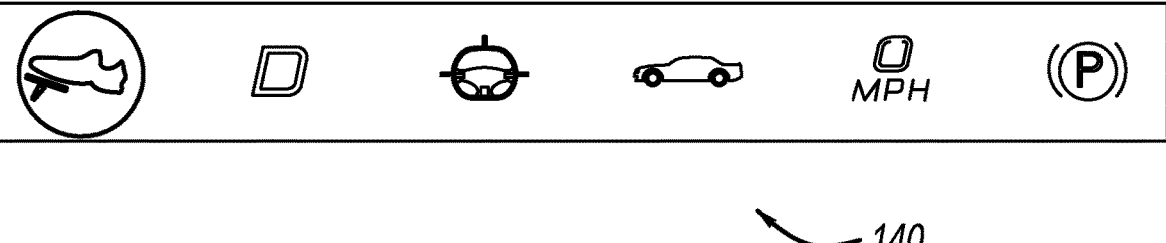
Figure 2D:
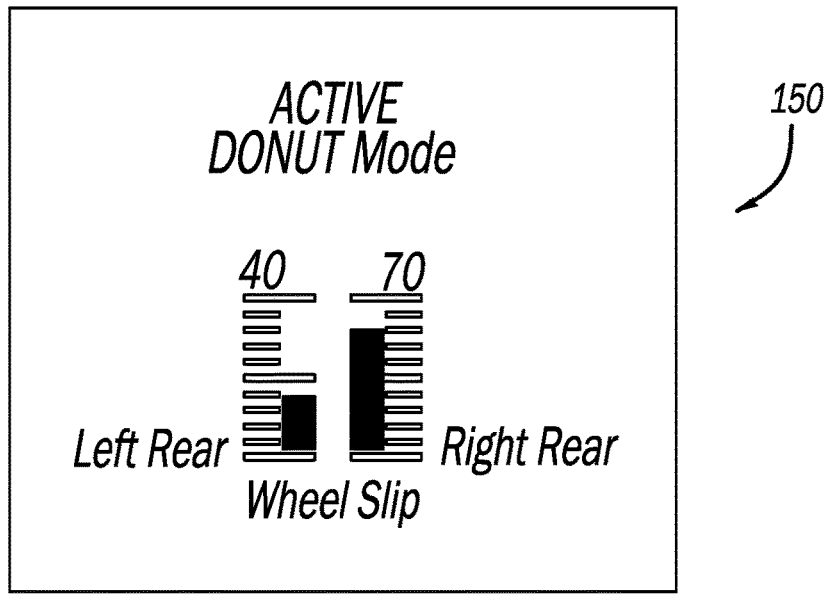

With initial reference to FIG. 1, an exemplary vehicle system is schematically shown and generally identified at reference numeral 10. In accordance with various aspects of the present disclosure, interactive techniques, referred to herein as a "donut mode" for permitting an exemplary vehicle 14 to perform a donut are implemented utilizing the vehicle system 10. As will be discussed in greater detail below, in one example implementation the interactive donut mode is initiated upon a vehicle driver selecting a donut mode from an interactive menu displayed on an instrument cluster of the vehicle system. The donut mode can only be entered based on satisfying a number of vehicle conditions.

With continuing reference to FIG. 1, the exemplary vehicle system 10 is associated with an exemplary electrified vehicle 12 and includes an electrified powertrain 14 configured to transfer drive torque to a driveline 16 of the vehicle 14 for propulsion. The electrified powertrain 14 generally comprises a high voltage battery system 18, one or more electric motors 20, and a transmission 24. The one or more electric motors 20 and the transmission 24 can be collectively referred to herein as an electric drive module 26. While the exemplary implementation includes a transmission 24, in some examples the electrified powertrain 14 does not include a transmission.

The vehicle system 10 further includes a traction controller and/or an anti-lock brake system (ABS) 32. While shown together it will be appreciated that the vehicle system can have a dedicated traction control system that operates independent of an anti-lock brake system. The vehicle system 10 further includes a driver interface 36 and an instrument panel or cluster 40. The instrument panel or cluster 40 can include any interface device, such as a driver information center and/or vehicle infotainment system capable of receiving input from a driver.

The electric motor 20 includes an engine speed sensor 44. The transmission 24 includes various transmission speed sensors, such as input and output transmission shaft speed sensors 48 and various shift sensors 52, to provide a signal to an associated control system indicative of a transmission gear selected. The transmission 24 and traction controller 32 are coupled or selectively coupled, directly or indirectly, to one or more wheels 58 of vehicle 12, as is known in the art. In the exemplary vehicle system, all of the wheels 58 are drive wheels that receive torque input. While the motor 20 is described herein as an electric motor, in other examples, the vehicle system 10 can be configured with a conventional internal combustion engine (ICE), or a hybrid electric vehicle.

The wheels 58 are identified individually as front wheels 58A, 58B and rear wheels 58C, 58D. The wheels 58A, 58B, 58C and 58D each have wheel speed sensors 62A, 62B, 62C and 62D. In the example shown, the front wheels 58A and 58B are selectively coupled by a front axle 64. Similarly, the rear wheels 58C and 58D are selectively coupled by a rear axle 66. In the exemplary implementation illustrated, the traction controller 32 is controlled to activate foundation brakes 60.

The instrument panel cluster 40 includes various indicators, such as a donut mode activate light or indicator 68. As will be described herein with respect to FIGS. 2A-2D, the instrument panel cluster 40 provides a menu driven sequence to the driver to enable donut mode. The driver interface 36 includes a steering wheel 70 and a brake pedal 72. The driver interface 36 includes a driver input device, e.g., an accelerator pedal 74, for providing a driver input, e.g., a torque request, for the motor 20. The driver interface 36 can further include a park brake 76. The driver interface 36 or vehicle interior also includes a transmission shift request device, such as a shift lever or rotary shifter 78, for the driver to request a desired gear of the transmission 24. The shift lever or rotary shifter 78 can provide conventional transmission options including park, reverse, neutral, drive and low. The vehicle system 10 also includes sensors 80. The sensors 80 can include longitudinal sensor or other equivalent sensor for providing data indicative of whether or not the vehicle 12 is on a grade and the incline or angle of the grade.

One or more controllers are utilized to control the various vehicle components or system discussed above. In one exemplary implementation, various individual controllers are utilized to control the various components/systems discussed herein and are in communication with each other and/or the various components/systems via a local interface 84. In this exemplary implementation, the local interface 84 is one or more buses or other wired or wireless connections, as is known in the art. In the example illustrated in FIG. 1, the local interface 84 is a controller area network (CAN). The CAN 84 may include additional elements or features, which have been omitted for simplicity, such as controllers, buffers (cache) drivers, repeaters and receivers, among many others, to enable communications. Further, the CAN 84 may include address, control and/or data connections to enable appropriate communications among the components/systems described herein.

In the example illustrated in FIG. 1, the vehicle system 10 includes an electric motor control unit (ECU) 90 for controlling the motor 20, and a transmission control unit (TCU) 94 for controlling the transmission 24. Both of the control units 90 and 94 as well as the traction controller 32, driver interface 36, instrument cluster 40 and sensor 80 are in communication with CAN 84 and thus each other. Again, in some examples a transmission 24 and therefore the TCU 94 is not included. It will be appreciated that while individual control units are discussed herein and shown in various Figures, the individual control units may also be optionally implemented in the form of one control unit, such as a powertrain or vehicle control unit, represented by broken line 104 in FIG. 1. Thus, it will be appreciated that while the discussion will continue with reference to the individual controllers discussed above, the discussion is equally applicable to the components of vehicle system 10 being controlled by one controller.

Referring now to FIGS. 2A-2D and with reference back to FIG. 1, an example menu sequence provided to the vehicle driver at the instrument panel cluster 40 will be described. At FIG. 2A, a first menu 110 displays performance pages 112, drive modes 114 and race options 116. As a result of a driver selecting race options 116 at the first menu 110, a second menu 120 (FIG. 2B) is displayed at the instrument panel cluster 40. The second menu 120 can include various modes including a donut mode 130. As a result of the driver selecting the donut mode 130 at the second menu 120, a third menu 140 (FIG. 2C) is displayed at the instrument panel cluster 40. The third menu 140 can include instructions to the driver with vehicle conditions that must be satisfied for entering donut mode.

Exemplary instructions include a state of charge of the battery system 18 must be above a threshold (such as 20%). The brake pedal 72 must be applied. The shift lever or rotary shifter 78 must be in drive. The steering wheel 70 must be straight. The speed of the vehicle 12 mush be zero. The vehicle 12 must be on level ground (such as based on an input from the sensor 80). The park brake 76 must not be engaged. With all vehicle conditions being satisfied at the third menu 140, a fourth menu 150 (FIG. 2D) is displayed at the instrument panel cluster 40. In examples, the fourth menu 150 can comprise a wheel slip graphic or meter that displays wheel slip (e.g., such as for the rear wheels 58C and 58D). It is appreciated that the menus 110, 120, 140 and 150 illustrated are merely exemplary and may take many different forms. It is further contemplated that some of the menus (or an additional menu) can be additionally configured to instruct the vehicle driver on how to initiate the slip of both rear tires and spinning of the vehicle 12 around any one of the front wheels 58A, 58B.

Figure 3:
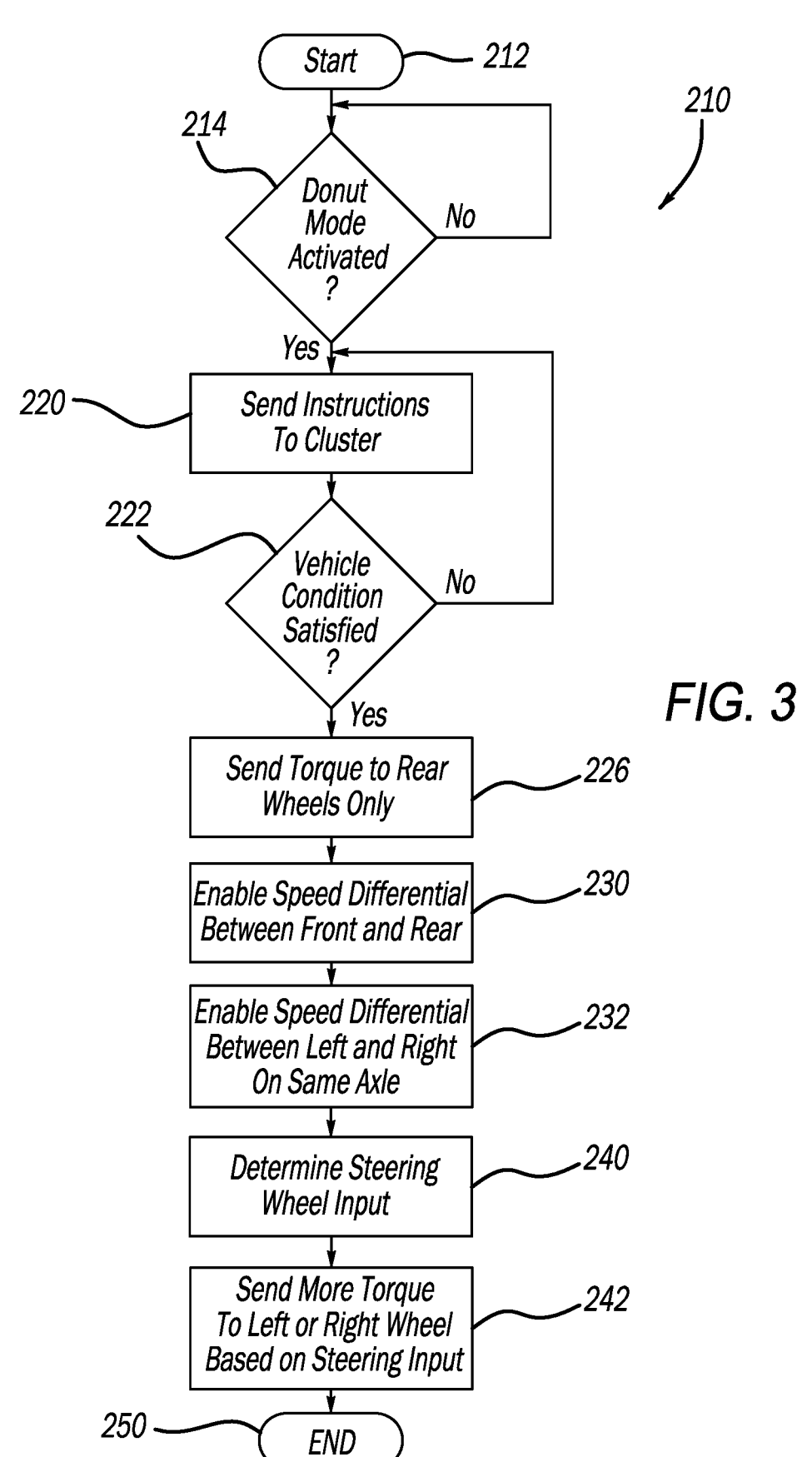
FIG. 3 is an example functional block diagram of a donut mode implemented by the exemplary controller of FIG. 1 according to the principles of the present disclosure.

Accordingly, systems and methods or techniques are provided for implementing the donut mode using the vehicle system 10. One example implementation of such donut mode technique is discussed below in connection with the exemplary flowchart 210 shown in FIG. 3.

With particular reference to FIG. 2, the exemplary methodology 210 for operating a donut mode in the vehicle system 10 will be described. The method 210 starts at 212. At 214 control determines whether the donut mode has been activated/initiated. Again, the donut mode can be initiated such as by selection of the donut mode at menu 120 (FIG. 2B) on the drive interface 36 (see FIG. 1). If the donut mode has not been initiated, control loops to 214. If donut mode has been initiated at 214, control identifies the instructions to the vehicle driver with vehicle requirements that must be satisfied to proceed with donut mode. In examples, at least one of the controllers 32, 90, 94 can determine whether the vehicle conditions are satisfied. If the vehicle requirements have not been satisfied at 222, control loops to 220. It is contemplated that the instrument cluster 40 can alert or highlight to the driver which condition or conditions are not yet satisfied such that the driver can perform corrective actions to satisfy the identified requirements.

If the vehicle requirements have been satisfied at 222, control sends torque to the rear wheels 58C and 58D only at 226. At 230 control enables speed differential between the front and rear axles 64, 66. At 232 control enables speed differential between the left and right wheel (58A, 58C, 58B, 58D) on the same axle (64, 66). At 240 control determines an input of the steering wheel 70. Based on the direction of the steering wheel 70, control determines which wheel requires more torque to exasperate the slip condition. In this regard, at 242 control sends more torque to the left or right wheel (58C, 58D) based on the steering input. Control ends at 250.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle system for an electrified vehicle that implements a donut mode to vehicle wheels for creating a donut, the vehicle system comprising:

a motor that provides drive torque to at least one wheel of the vehicle wheels for propelling the vehicle, the vehicle wheels including left and right rear wheels and left and right front wheels;

a steering wheel that communicates a steering wheel signal indicative of a direction intended for the vehicle to travel;

an instrument panel cluster configured to display a user interface menu that includes a user selectable donut mode, and a wheel slip meter that dynamically displays a wheel slip graphic of the left rear wheel and the right rear wheel;

a controller that initiates the donut mode based on user selection of the donut mode, wherein the controller:

determines whether vehicle conditions are satisfied;

enables, based on the vehicle conditions being satisfied, torque to be delivered from the motor to the left and right rear wheels;

enables speed differential between the (i) left and right rear wheels and the (ii) left and right front wheels;

determines a direction of the steering wheel based on the steering wheel signal;

determines, based on the direction of the steering wheel input, a desired torque input to one of the left and right rear wheels;

instructs the motor to deliver the desired torque; and displays, at the wheel slip meter, the wheel slip graphic indicative of:

an active donut mode;

a first wheel slip at the left rear wheel; and a second wheel slip at the right rear wheel.

2. The vehicle system of claim 1, wherein the vehicle conditions include a battery system that powers the motor having a charge above a charge threshold.

3. The vehicle system of claim 2, wherein the charge threshold is 20%.

4. The vehicle system of claim 1, wherein the vehicle conditions include a steering wheel input indicative of a straight direction.

5. The vehicle system of claim 1, further comprising a grade sensor that communicates a grade signal to the controller indicative of a grade the vehicle occupies, wherein the vehicle conditions include a grade of zero.

6. The vehicle system of claim 1, further comprising wheel speed sensors at each of the vehicle wheels that communicate wheel speed signals to the controller, wherein the vehicle conditions include wheel speeds from the respective wheel speed sensors of zero.

7. The vehicle system of claim 1, further comprising a park brake that communicates a park brake signal to the controller, wherein the vehicle conditions include a park brake signal indicative of the park brake being not engaged.

8. A method for implementing a donut mode to vehicle wheels for creating a donut on an electrified vehicle having an electric motor, the method comprising:

determining, at a first user interface menu on an instrument panel cluster, whether a graphic indicative of race options has been selected;

determining, based on the race options being selected, at a second user interface menu on the instrument panel cluster, whether a graphic indicative of a donut mode has been activated;

displaying, based on the donut mode being selected, at a third user interface menu on the instrument panel cluster, instructions indicative of vehicle conditions that must be satisfied for entering the donut mode;

determining whether vehicle conditions are satisfied;

displaying, based on the vehicle conditions being satisfied, a wheel slip meter on the instrument panel cluster that displays a wheel slip graphic of the left rear wheel and the right rear wheel;

enabling, based on the vehicle conditions being satisfied, torque to be delivered from the electric motor to left and right rear wheels of the vehicle wheels;

enabling speed differential between the (i) left and right rear wheels and (ii) left and right front wheels of the vehicle wheels;

determining a direction of a steering wheel input;

determining, based on the direction of the steering wheel input, a desired torque input to one of the left and right rear wheels;

instructing the motor to deliver the desired torque based on the determined desired torque input; and displaying, dynamically, at the instrument panel cluster, the wheel slip graphic indicative of:

an active donut mode;

a first wheel slip at the left rear wheel; and a second wheel slip at the right rear wheel.

9. The method of claim 8, wherein determining whether vehicle conditions are satisfied comprises:

determining whether a battery system that powers the motor has a charge above a charge threshold.

10. The method of claim 9, wherein the charge threshold is 20%.

11. The method of claim 8, wherein determining whether vehicle conditions are satisfied comprises:

receiving a steering wheel signal from a steering wheel; and determining that the steering wheel signal is indicative of a straight direction.

12. The method of claim 8, wherein determining whether vehicle conditions are satisfied comprises:

receiving a grade signal from a grade sensor indicative of a grade the vehicle occupies; and determining that the grade signal is indicative of a level ground.

13. The method of claim 8, wherein determining whether vehicle conditions are satisfied comprises:

receiving speed signals from wheel speed sensors at the left and right front wheels and the left and right rear wheels; and determining that the speed signals are indicative of a zero speed.

14. The method of claim 8, wherein determining whether vehicle conditions are satisfied comprises:

receiving a park brake signal from a park brake; and determining that the park brake signal is indicative of the park brake not being engaged.

* * * * *